United States Patent

Shelnutt

[11] B 3,914,690
[45] Oct. 21, 1975

[54] SCR AND DIODE TESTER
[75] Inventor: Robbie E. Shelnutt, Rte. 3, Carrollton, Ga. 30117
[73] Assignee: Southwire Company, Carrollton, Ga.
[22] Filed: Mar. 2, 1973
[21] Appl. No.: 337,703
[44] Published under the Trial Voluntary Protest Program on January 28, 1975 as document no. B 337,703.

[52] U.S. Cl......... 324/158 D; 324/110; 324/158 SC
[51] Int. Cl.$^2$...................... G01R 31/22; G01R 1/36
[58] Field of Search...... 324/158 D, 158 SC, 158 T, 324/110

[56] References Cited

UNITED STATES PATENTS

| | | | |
|---|---|---|---|
| 2,895,106 | 7/1959 | Taunt............................. | 324/158 D |
| 3,193,766 | 7/1965 | Fleming........................ | 324/158 SC |
| 3,478,264 | 11/1969 | Tsergas......................... | 324/158 SC |
| 3,676,767 | 7/1972 | Boelter.......................... | 324/158 D |

OTHER PUBLICATIONS

Hopkins, T. E., "SCR Tester," Electronics World, Jan. 1964, pg. 56.

Primary Examiner—Alfred E. Smith
Assistant Examiner—Ernest F. Karlsen
Attorney, Agent, or Firm—Van C. Wilks; Herbert M. Hanegan; Stanley L. Tate

[57] ABSTRACT

An apparatus for testing solid state devices such as SCR's and diodes which includes a power supply for supplying rated voltage to the device under test and a control voltage supply means for supplying a control voltage to the gate electrode of the device under test. A first indicator connected in the anode-cathode circuit of the device under test indicates whether the device is operating properly in response to the application of its rated voltage while a second indicator indicates whether the device under test is forward or reversed biased. The power supply and control voltage supply are independently variable so that diodes and SCR's having differently-rated voltages and gate voltages may be tested. The apparatus includes a test SCR which may be connected into the apparatus in place of a device under test to insure that the apparatus is operating properly inasmuch as the response of the indicators to the test SCR is known. The apparatus also includes an overload protection circuit which is used when the rated voltage of the device under test is above a predetermined level. The overload protection circuit connects an additional lamp in series with an indicator lamp of the first indicator, and also connects a resistance in series with the second indicator.

4 Claims, 1 Drawing Figure

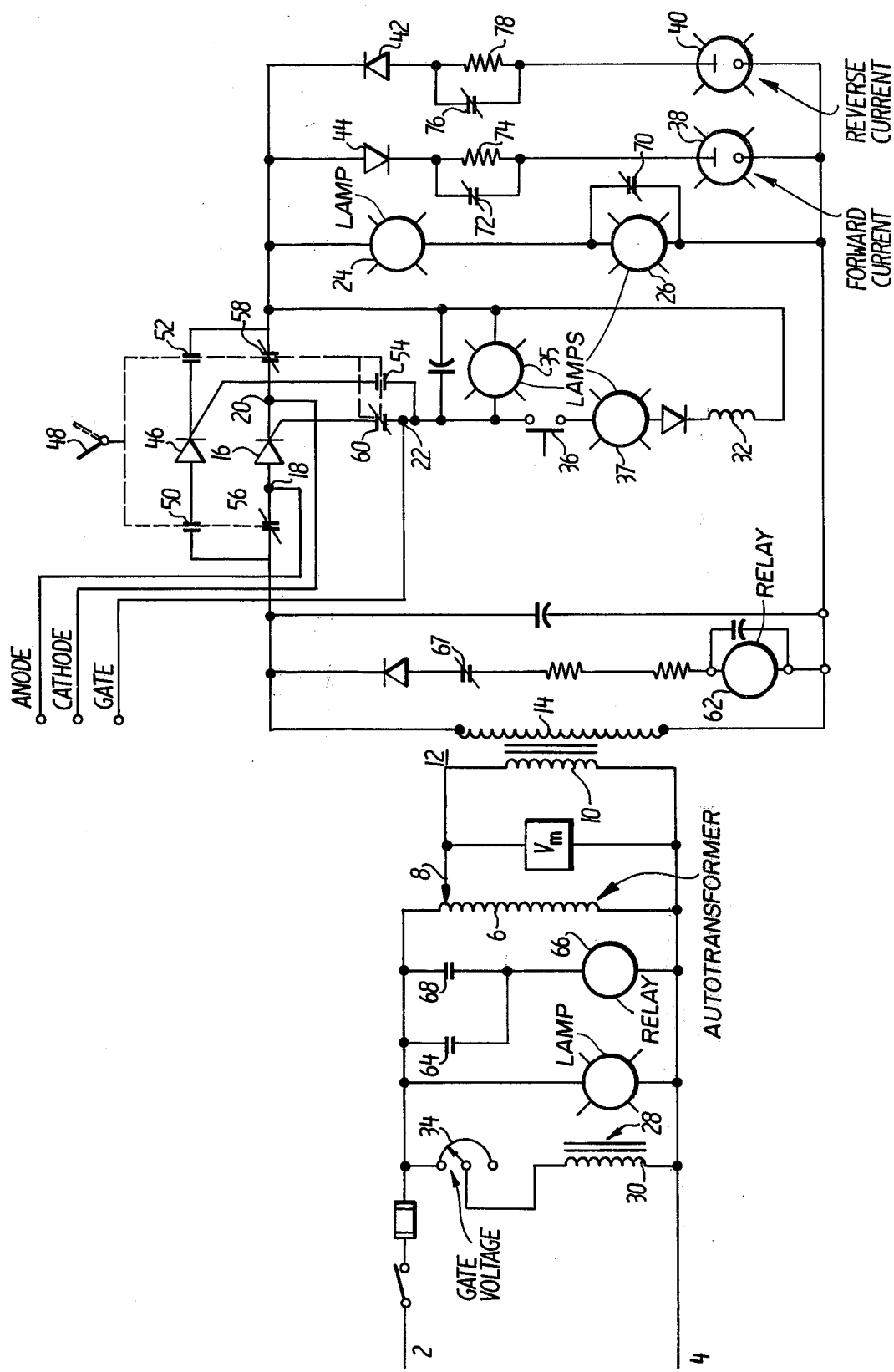

SCR AND DIODE TESTER

BACKGROUND OF THE INVENTION

1. Field of the Invention:

This invention relates to an apparatus for testing solid state devices and more particularly to an apparatus for testing silicon controlled rectifiers (SCR's) and diodes. The apparatus includes a first indicator for indicating a proper response to the application of the rated voltage and a second indicator for indicating whether the device is forward or reverse biased; a test SCR for insuring that the apparatus is operating properly, and an overload protection circuit for protecting the indicators when a device having a high rated voltage is being tested.

2. Description of the Prior Art:

Prior art devices have been developed for the testing of diodes and SCR's. One such device which is shown in the GE *Silicon Controlled Rectifier Manual*, 1960, pp. 198–203, includes independently variable voltage supplies for supplying rated voltage and the gate voltage to the device under test. However, this device has several disadvantages. First, it requires the operation of a switch for testing the device in the forward and reverse direction. This necessitates an extra step by the operator when testing a device and, furthermore, may be the source of an error in testing the device if the operator should become confused as to whether the device is being tested in a forward or reverse direction. Secondly, the device itself may not be operating properly and does not, therefore, in such condition, give any indication of possible erroneous results. In other words, the device does not include means for insuring that the test apparatus itself is in proper operating condition prior to the testing of devices. Third, the prior art device has indicator circuits which operate over the full range rated voltages of the device under test. This, of course, requires the use of more expensive indicator equipment which will function over a large range of rated voltages.

OBJECTS AND SUMMARY OF THE INVENTION

A primary object of this invention is to provide an apparatus for testing solid state devices and particularly SCR's and diodes which overcomes the disadvantages of the prior art and which includes means for automatically testing the device in the forward and reverse direction, thereby producing an indication as to whether the device under test is forward or reverse biased.

Another object of this invention is to provide an apparatus for testing SCR's and diodes which incorporates a test SCR which may be connected to the apparatus to insure that the apparatus is operating properly prior to the testing of SCR's or diodes.

Still another object of this invention is to provide an SCR and diode testing apparatus which includes an overload protection circuit for automatically increasing the power handling capability of the indicator circuits when the voltage applied to the device under test increases above a predetermined level.

These and other objects are carried out in accordance with the present invention by providing solid-state-device-testing apparatus which includes a power supply means for providing the rated voltage of the device under test. This voltage may be varied so that devices having different rated voltages may be tested. Voltage supply means is provided for supplying control voltage to the gate electrode of an SCR being tested.

The apparatus includes a first indicator lamp which produces an output if the device under test conducts in response to the application of its rated voltage and a gate voltage in the case of an SCR. A second indicator indicates if the device under test is forward or reverse biased.

The apparatus also includes a test SCR which may be connected into the circuit of the apparatus by means of a switch. When the test SCR is connected into the apparatus, its rated voltage is applied thereto. The operability of the apparatus can readily be determined by noting the output of the indicators. This, of course, is a convenient method for testing the operability of the apparatus and insuring that when a device is tested, and it is indicated as being defective, that it is in fact the device and not the apparatus which is defective. An overload protection circuit is provided which automatically reduces the power supplied to the indicators when the voltage applied to the device under test is above a predetermined level. This eliminates the need for using indicators having a high rated voltage or which are responsive to a wide range of voltages.

BRIEF DESCRIPTION OF THE DRAWINGS

The single FIGURE is a schematic diagram of the circuit of the preferred embodiment of the present invention.

DESCRIPTION OF THE PREFERRED EMBODIMENT

Referring to the FIGURE, terminals 2 and 4 are connected across a 115 v power line or any other suitable AC voltage source. The voltage is applied across autotransformer 6 having a tap 8. The voltage at tap 8 is applied across the primary 10 of stepup transformer 12 which has a secondary 14. An SCR 16 which is the device under test has its anode connected to terminal 18, its cathode connected to terminal 20 and its gate connected to terminal 22. These connections may be made directly or test leads having one end coupled to the device under test and the other end plugged into the test apparatus may be used. If a diode rather than a SCR is being tested, then the anode of the diode is connected to terminal 18 and the cathode to terminal 20. Terminal 22 is left unconnected. Indicator lamps 24 and 26 are connected to the cathode of the SCR 16. The rated voltage is applied to the SCR 16 by adjusting tap 8 of autotransformer 6 so that the voltage appearing in the secondary 14 of stepup transformer 12 is equal to the rated voltage of the SCR 16. If the gate electrode is energized, the SCR will turn ON thus lighting indicator lamp 24. Indicator lamp 26 will be included in the circuit in a manner to be discussed, when the rated voltage of the SCR 16 is high. If SCR 16 fails to conduct properly, then the indicator 24 will not light up and the operator of the test apparatus will have an indication that the device under test 16 is not functioning properly.

Transformer 28 having a primary 30 and a secondary 32 is used for supplying the gate voltage to the SCR under test. A variable resistor 34 is connected in series with the primary 30 of transformer 28 and used to control the voltage across the primary. This voltage is transferred to the secondary 32 and is applied to gate terminal 22 of the device under test when gate switch 36 is closed. Variable resistor 34 is used to adjust, to its rated value, the voltage applied to the gate of the device under test. When gate switch 36 is closed, lamps 35 and 37 will light up to indicate gate current and voltage, respectively.

Neon lamps 38 and 40 are used to indicate whether the device under test is ON when it is forward or reverse biased. Since the voltage appearing across the secondary 14 of transformer 12 is an AC voltage during the first half of the cycle, the device under test will be forward biased and thus neon lamp 38 will light up if the device is ON when forward biased. Diode 42 in series with indicator 40 prevents this neon lamp from lighting when the device under test is forward biased. During the negative half of the AC cycle, lamp 40 will turn ON if the device is ON when reversed biased and lamp 38 will become extinguished due to the blocking effect of diode 44. As an example, if the device under test is an SCR, lamp 38 will turn ON during the positive half cycles of AC and lamp 40 will remain OFF during the whole cycle. If, however, the device under test operates when reversed biased to a breakdown voltage level, such as a zener diode, then during the negative half cycle lamp 40 will be ON and, during positive half cycle, lamp 38 will be on.

The apparatus includes a self-testing feature in which an SCR 46, having known characteristics, is substituted for the device under test. A switch 48 is moved from a first position to a second position when device 16 is replaced with device 46. In the second position normally open contacts 50, 52 and 54 are closed and normally closed contacts 56, 58 and 60 are opened. In this manner, SCR 46 is connected into the circuit in exactly the same manner as was the device under 16. When the rated voltage of the test device 46 is applied in its anode-cathode circuit and its rated gate voltage is applied to its gate, indicator 24 should light up thereby indicating that the SCR is operating properly. Also, the forward and reverse indicators 38 and 40 should produce outputs at the appropriate times during the AC cycle. The use of test device 46 enables the apparatus of the present invention to be quickly checked to make certain it is in proper operating conditions. Thus, a subsequently indicated fault, e.g., short, open, breakdown or the like is attributable to the device under test rather that the test apparatus. An overload protection circuit is employed to protect the indicators when testing a device 16 with a high-rated voltage, e.g., 120 volts or above. The overload protection circuit includes a relay coil 62 in the secondary circuit of transformer 12. When the voltage across the secondary 14 is above a predetermined level, relay 62 is energized, closing the normally open contacts 64. The contacts 64 are series connected to a coil 66 of a second relay. The energization of the second relay opens normally-closed contacts 67 which de-energize relay 62, closes normally open holding contacts 68 and opens normally-closed contacts 70 which are in parallel with lamp 26, open contacts 72 which are in parallel with resistors 74, and opens contacts 76 which are parallel with resistor 78. When normally closed contacts 70 are open, lamp 26 which was shunted by the closed contacts 70 is placed in series with lamp 24 thus enabling the indicator circuit to handle twice the voltage as single indicator lamp 24. The normally-closed contacts 72 and 76 shunt resistors 74 and 78. When these contacts are open, the resistors 74 and 78 provide current limiting for the indicators 38 and 40. The indicators 24, 38 and 40 are thus protected when it is necessary to apply a high-rated voltage to the device under test without the necessity of using indicators which have a high rating themselves.

When testing a device 16, such as an SCR, its rated anodecathode voltage is set by adjusting tap 8 of autotransformer 6. Then the rated gate voltage is set by adjusting variable resistor 34. Once the rated voltages have been set, the device 16 is connected to the apparatus by connecting its anode to terminal 18, its cathode to terminal 20 and its gate to terminal 22. After the device has been connected, gate switch 36 is closed and lamps 35 and 37 will light indicating proper gate voltage and current. If the device is functioning properly, lamp 24 will light, thus indicating proper operation.

It should be understood that while the invention has been described herein with specific reference to a particular embodiment thereof, minor modifications may be made without departing from the spirit of the invention.

What is claimed:

1. An apparatus for testing SCRs and diodes comprising:
   a. alternating-current power supply means for supplying selectively rated anode-cathode a.c. voltages to a diode or an SCR sought to be tested;
   b. control voltage supply means for supplying selectively a rated control voltage to the gate electrode of an SCR sought to be tested, said control voltage supply means and said power supply means being independently variable;
   c. an SCR having known characteristics;
   d. connection means including switch means having (1) a first position for connecting, via a given circuit within the apparatus, said alternating-current power supply means to the anode-cathode circuit of said SCR having known characteristics and for connecting said control voltage supply means to its gate electrode, and having (2) a second position for connecting, via said given circuit within the apparatus, said power supply means to the anode-cathode circuit of a diode or an SCR sought to be tested;
   e. first indicator means coupled to said switch means for indicating whether the diode or SCR sought to be tested operates properly in response to said rated voltages when said switch means is in said second position;
   f. second indicator means coupled to said switch means for indicating whether the diode or SCR sought to be tested is forwardly or reversely biased, when said switch means is in said second position, said first indicator means and said second indicator means indicating whether the apparatus is properly operating when said switch means is in its first position; and
   g. overload protection means for protecting said first and second indicator means when said power supply means supplies a voltage above a given level by connecting additional impedance in series with said first and second indicator means whereby said apparatus continues to operate in a normal fashion.

2. The appratus as set forth in claim 1 wherein said overload protection means comprises:
   a. relay means, said relay means being energized when said power supply means supplies a voltage above said predetermined level;

b. resistance means; and c. first contact means associated with said relay means for placing said resistance means in series with said second indicator means when said relay means is energized.

3. The apparatus as set forth in claim 2 wherein said first indicator means comprises a first and second lamp and wherein said overload protection means includes second contact means for connecting said second lamp in series with said first lamp when said relay means is energized.

4. The apparatus as set forth in claim 1 wherein said second indicator means comprises:

a. first lamp means, said first lamp means turning ON when said device under test is forward biased and ON; and b. second lamp means, said second lamp means turning ON when said device under test is reverse biased and ON.

* * * * *